United States Patent [19]
Lincoln et al.

[11] Patent Number: 6,037,569
[45] Date of Patent: Mar. 14, 2000

[54] AUTOMATIC HEATING OVEN SYSTEM

[75] Inventors: James E. Lincoln; Steven R. Lincoln, both of Dallas, Tex.

[73] Assignee: McFarlin Supply Corp., Dallas, Tex.

[21] Appl. No.: 09/079,607

[22] Filed: May 15, 1998

[51] Int. Cl.[7] ...................................................... F27B 9/06
[52] U.S. Cl. ........................ 219/388; 219/386; 219/387; 219/685; 219/701; 126/21 A; 126/41 A; 99/423
[58] Field of Search ..................................... 219/388, 386, 219/387, 744, 762, 685, 701, 755; 99/476, 423, 443 R; 426/107, 237, 502; 126/21 A, 41 A, 19

[56] References Cited

U.S. PATENT DOCUMENTS

| | | | |
|---|---|---|---|
| 4,039,796 | 8/1977 | Leibin et al. | 219/10.55 A |
| 4,239,009 | 12/1980 | Cunningham | 219/755 |
| 4,506,652 | 3/1985 | Baker et al. | 126/21 |
| 4,999,468 | 3/1991 | Fadel | 219/685 |
| 5,034,587 | 7/1991 | Takagi | 219/10.55 F |

*Primary Examiner*—Teresa Walberg
*Assistant Examiner*—L Fastovsky
*Attorney, Agent, or Firm*—Roger C. Clapp

[57] ABSTRACT

An automatic heating oven system employs a cabinet containing a heating chamber with radiant heating elements and a turntable rotatable at a fixed slow angular speed. A thermocouple controls the heating elements to maintain the turntable above a minimum elevated temperature at all times. An entry chute with proximity switch extends into the chamber, and passage of a food-laden tray down the chute to the turntable triggers the switch, activating the turntable and an exhaust fan and, if not already on, the heating elements. A guide bar extending across the turntable at an oblique angle to all possible paths of travel of the food item on the turntable directs the food out an exit to a receiving rack outside the oven, before the food item completes a complete revolution on the turntable. A retriggerable timer turns off the heaters, fan and turntable a fixed time period after the most recent activation of the proximity switch.

24 Claims, 2 Drawing Sheets

AUTOMATIC HEATING OVEN SYSTEM

BACKGROUND OF THE INVENTION

The heating of precooked or partially precooked food items in a quick service commercial context is an important application of oven technology. In this regard, conventional microwave ovens are frequently located at convenience stores for use by the customer or clerk in heating food items purchased at the stores. However, the microwave heating process causes texture and taste problems in the finished products, particularly in pizza crusts and other breaded items. Until this invention, no way has been found to employ conventional, non-microwave, heating methods to prepare hot foods such as hamburgers and pizza within the convenience store constraints of low labor input, low capital cost, low maintenance, compact size and short preparation time.

SUMMARY OF THE INVENTION

This invention contemplates an automatic heating oven system which is compact and essentially automatic, requiring only that the user place the specially sized and configured precooked food item on an open tray into a slot in the oven wall with the result that, a short time later, the properly heated item is returned through an outlet onto a finished goods receiving rack.

In accordance with the invention, there is provided a heating chamber mounting heating elements and a turntable for rotation at a predetermined slow angular speed. An entry slot is provided in the wall of the chamber for receiving a specially prepared food item to be heated onto the turntable, and an exit slot is positioned adjacent the turntable. Guide means direct the food item on the turntable to the exit slot after it has rotated no more than 360 degrees. Sensing and control means cause the heating means to maintain the turntable at a temperature above a predetermined level, so that the turntable, even when no food item is being heated, remains at an elevated temperature. An outer cabinet surrounds the heating chamber, providing an insulating air space, and an exhaust fan is mounted on the outer cabinet.

In the preferred embodiment of the invention, the entry slot is provided with a ramp extending downwardly and inwardly toward the turntable, and a proximity switch is mounted in the ramp so that it is activated by passage of a food item on an open tray down the ramp to the turntable. Triggering of the proximity switch turns on the heating means, the motor driving the turntable and the exhaust fan, to commence the automatic heating cycle. A timer is activated by the proximity switch so that the timer switches off the heating means, turntable and exhaust fan at a predetermined time after the last activation of the proximity switch.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENT

Figure 1:
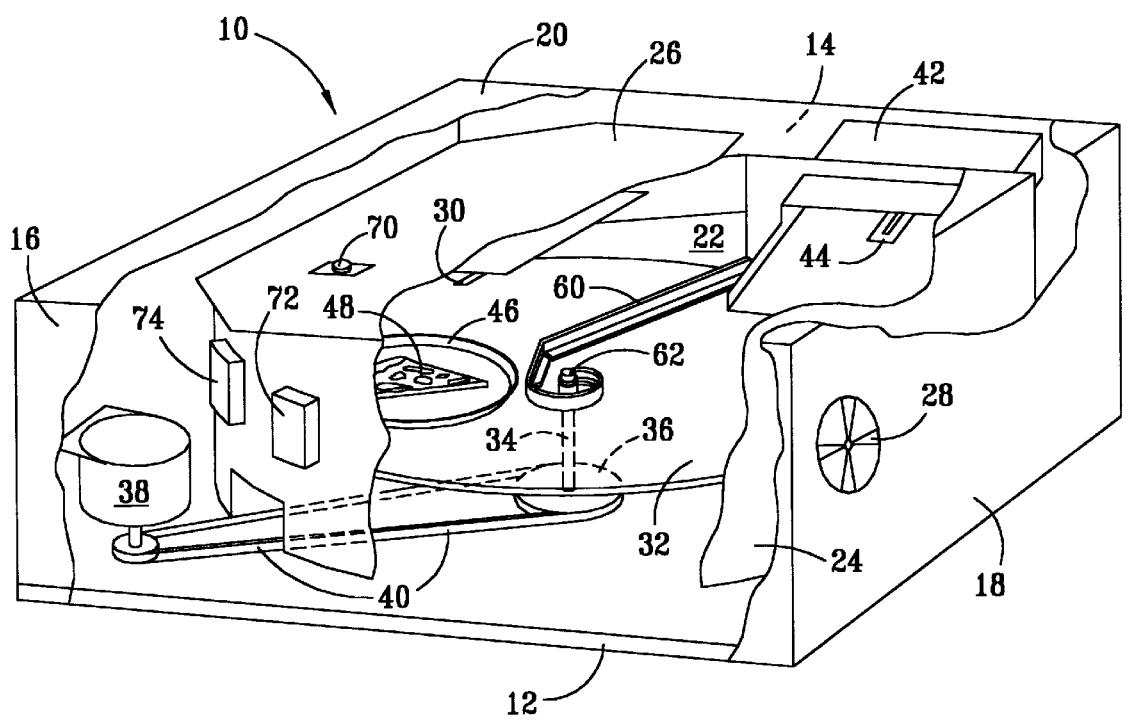
FIG. 1 is a perspective view of the rear of an oven constructed in accordance with the invention, with elements partially cut away for ease of viewing.
Figure 2:
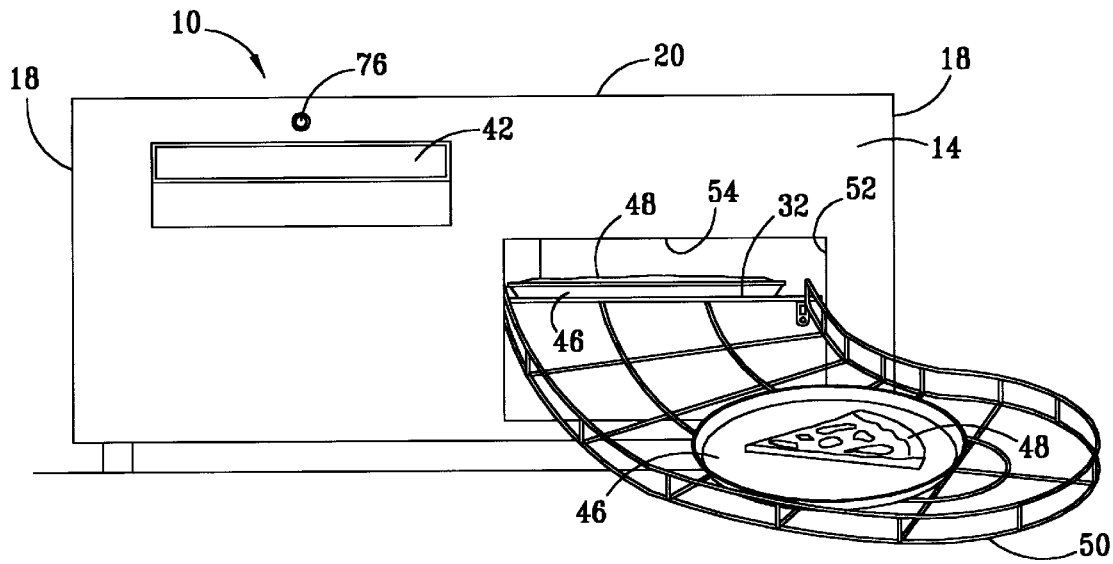
FIG. 2 is a view of the front of the oven of FIG. 1.

An oven constructed in accordance with the invention includes an enclosing outer cabinet 10 having a base 12, front wall 14, rear wall 16, side walls 18 and a top 20. A satisfactory oven may be constructed with an outer cabinet footprint of only 20 inches square. A heating chamber 22 is formed within cabinet 10 by a vertical generally cylindrical wall 24 extending upwardly from base 12 to a cover 26. The heating chamber wall 24 and cover 26 are spaced inwardly from the outer cabinet 10, providing an insulating air space between cabinet 10 and heating chamber 22. An exhaust fan 28 is mounted in a side wall 16 of cabinet 10. Heating elements 30 are mounted on the bottom side of heating chamber cover 26, and one of the elements 30 can be seen in FIG. 1. The heating elements 30 are conventional radiant heaters, and are spaced across the cover 26.

A turntable 32 is mounted within the wall 24 of heating chamber 22 on rotating shaft 34. The outer circumference of turntable 32 is closely adjacent the wall 24 over most of its extent, so that turntable 32 defines a floor for heating chamber 22. While we have not found it to be necessary, an auxilliary heating element (not shown) may be mounted below turntable 32 to increase the heat applied to the system. Such an auxilliary heating element would be controlled with heating elements 30 as described below.

Shaft 34, which is journalled at base 12 and extends upwardly of turntable 32 to a top threaded end, carries a pulley 36 operatively connected to a drive motor 38 by a horizontal drive belt 40. Drive motor 38 is mounted on base 12 outside of the heating chamber wall 24, and is designed to operate at a predetermined speed to rotate shaft 34 and turntable 32 at a fixed slow angular speed. Turntable 32 is designed to retain heat energy well, and may be formed from aluminum stock of about one-eighth inch thickness.

A product entrance chute 42 extends from outside the oven through narrow slots in outer cabinet front wall 14 and heating chamber wall 24, downwardly and inwardly toward turntable 32. A proximity switch 44 is positioned in the floor of chute 42, so that an open tray 46 carrying a food item 48 trips switch 44 when it is placed on chute 42 and slides down onto turntable 32. It should be noted that food item 48 is specially sized and configured to match the operating characteristics of the automatic operation of the oven cycle. Only by matching the food items to the fixed heating cycle may proper results be unvaryingly achieved. In this regard, the system of this invention is thought to be dissimilar to any previously proposed, in that a fixed oven cycle is established, so that food items must be prepared to match that cycle for proper heating of the food items.

A discharge receiving rack 50 is positioned adjacent turntable 32, and extends downwardly and outwardly from just below the level of turntable 32 out through open exit aperture 54 in cabinet wall 14. The heating chamber wall 24 is straight and at an angle to front cabinet wall 14 in the region of discharge rack 50, so that turntable 32 extends slightly past the lip of an opening 52 in wall 24, just over rack 50 at the discharge point indicated by arrow in FIG. 3.

Figure 3:
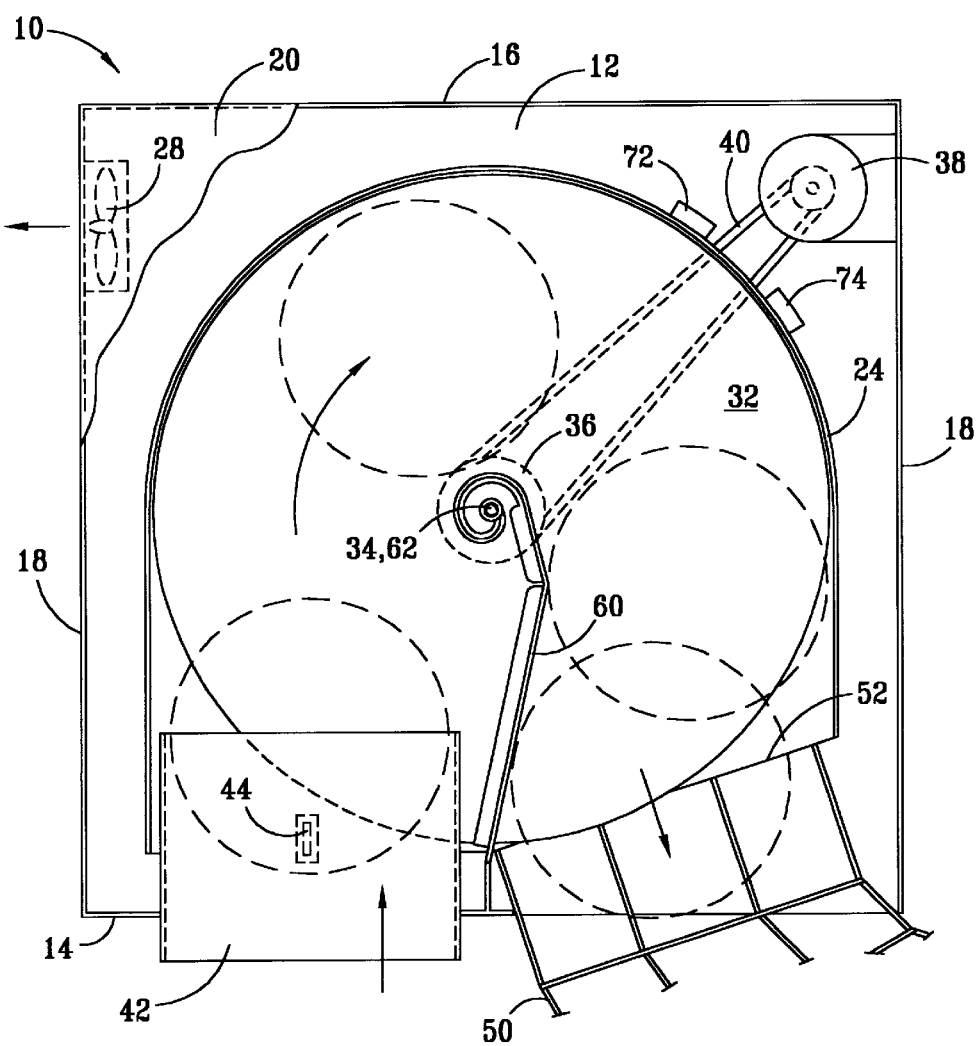
FIG. 3 is a simplified top view showing the turntable, entry and exit points and exit guide means of the oven of FIG. 1.

An exit guide bar 60 is loosely held in place atop turntable 32 by capnut 62 on the upper threaded end of shaft 34. Guide bar 60 is formed from angle stock aluminum and is formed as shown in FIG. 3 so that when its outer end is positioned against the side of opening 52, its vertically extending leg obstructs the path of a tray 46 on turntable 32 at an oblique angle to all possible travel paths of the tray 46, guiding it out to the edge of turntable 32 and out through opening 52 onto discharge receiving rack 50. Various stages of progression of the tray 46 are illustrated in phantom in FIG. 3. The horizontal element of guide bar 60 positioned away from the food items traveling clockwise on turntable 32, provides strength and also a site for an aperture to position the bar 60 loosely over shaft 34.

A thermocouple 70 responsive to the temperature in heating chamber 22 is mounted on the bottom side of heating chamber cover 26. Control element 72 is mounted on a rear portion of wall 24, adjacent timer mechanism 74. A ready light 76 is positioned on the front wall 14 of cabinet 10 adjacent entry chute 42. The interconnection of the control elements will be described below in connection with an explanation of the automatic operation of the oven.

The heating oven system of this invention is essentially labor free in its application. Only two operator steps are necessary for operation: switching the unit on; and, after the oven is in a ready state, placing a tray 48 containing a specifically prepared food item 46 on entry chute 42. chamber 22 to a desired temperature range. The objective of this is to heat turntable 32 to at least a desired minimum temperature of approximately 250 degrees Fahrenheit. It has been found experimentally that this result can be achieved by controlling the air temperature in heating chamber 22 over a fairly broad range, from about 250 to 300 degrees Fahrenheit. Thus, with the unit on, but no demand for heating created by placing a food item therein, the unit will maintain the air temperature within this range to control turntable 32 above the desired minimum level. The power requirements for such standby maintenance of elevated temperature are relatively modest, with the heating elements being required only roughly thirty to forty percent of the time the unit is on extended standby. On initial startup of the equipment, ready light 76 comes on when the desired temperature range is reached, signifying to the operator that the unit may now receive food items for heating.

Placement of a tray 46 containing food item 48 on entry chute 42 initiates a timed heating cycle of the equipment. The sliding of tray 46 down chute 42 triggers switch 44 to turn on heaters 30 (if not already on responsive to thermocouple 70), turntable drive motor 38, exhaust fan 28 and timer 74. Timer 74 is set to turn off the heaters, drive motor and fan a predetermined time lapse after the last activation of switch 44. It has been found that a suitable angular speed for the turntable 32 is approximately one revolution every three minutes, so that the timer would be set for approximately three minutes. Other times and angular speeds may be appropriate, although the parameters selected must then be matched by the food item characteristics so that proper heating is achieved. Each entry of a food item activates switch 44, so that timer 74 is retriggered when a food item is deposited when one or more food items are already on the turntable 32. Thus, the heating cycle will remain in activated state for as long as any food item is on the turntable 32.

The system of this invention has proven suitable for a number of specially prepared food items, including hamburgers, pizzas, chicken breasts, boneless ribs, pizzaburgers, meat loaf, chicken fried steaks and other breaded items, and a variety of other foods. The matching of the food items to the heating cycle produces proper heating above National Sanitation Foundation's requirements with little if any spattering outside of the trays 46. Very little labor expenditure is involved in its use. The oven system is compact and readily usable in most commercial environments.

Whereas the present invention has been described with respect to specific embodiments thereof, it will be understood that various changes and modifications will be suggested to one skilled in the art and it is intended to encompass such changes and modifications as fall within the scope of the appended claims.

We claim:
1. An oven for heating food items, comprising:
 (a) a heating chamber;
 (b) a turntable mounted in the chamber for rotation at a predetermined slow angular speed;
 (c) chamber heating means;
 (d) an entry slot in a wall of the chamber above the turntable for receiving a food item;
 (e) an exit slot in the wall of the chamber adjacent the periphery of the turntable; and
 (f) guide means for causing a food item on the turntable to move outwardly off the turntable and through the exit slot after rotation of no more than 360 degrees of the food item on the turntable.

2. The oven of claim 1, further comprising sensing and control means for causing the heating means to maintain the turntable at a temperature above a predetermined minimum level.

3. The oven of claim 1, further comprising a ramp extending downwardly through the entry slot to the turntable for gravity feed of food items to be heated.

4. The oven of claim 3, further comprising a receiving rack extending outwardly and downwardly from the exit slot for receiving the heated food item.

5. The oven of claim 1, wherein the guide means comprises a fixed bar extending above the turntable toward the exit slot at an obtuse angle to all possible concentric paths of travel of a food item on the turntable.

6. The oven of claim 1, wherein the heating means comprises radiant heating elements positioned above the turntable.

7. The oven of claim 1, further comprising an outer cabinet encompassing said heating chamber to define an insulating air space between the cabinet wall and the heating chamber, and an exhaust fan for drawing air outwardly from the outer cabinet.

8. The oven of claim 1, wherein said predetermined slow angular speed of rotation of the turntable is no more than about one-third revolution per minute.

9. An oven for heating food items, comprising:
 (a) a heating chamber;
 (b) a solid metal disk heat sink turntable mounted in the chamber for constant rotation at a predetermined slow angular speed;
 (c) chamber heating means;
 (d) sensing and control means for causing the heating means to maintain the temperature of the turntable above a predetermined minimum level at all times;
 (e) an entry slot in a wall of the chamber above the turntable;
 (f) switch means to switch the heating means on if the heating means is off at the time a food item is inserted through the entry slot onto the turntable;
 (g) an exit slot in the wall of the chamber adjacent the periphery of the turntable; and
 (h) guide means for directing a food item outwardly off the turntable to the exit slot after rotation of no more than 360 degrees of the food item on the turntable.

10. The oven of claim 9, wherein the switch means is automatically responsive to placement of a food item onto the turntable.

11. The oven of claim 10, wherein the switch means is also operative to activate rotation of the turntable.

12. The oven of claim 10, further comprising a ramp extending downwardly through the entry slot to the turntable for gravity feed of food items to be heated.

13. The oven of claim 12, wherein the switch means comprises a proximity switch positioned in the ramp so that it is activated by passage of a food item on the ramp.

14. The oven of claim 12, further comprising a receiving rack extending outwardly and downwardly from the exit slot for receiving the heated food item.

15. The oven of claim 9, wherein the guide means comprises a fixed bar extending above the turntable toward the exit slot at an obtuse angle to all possible concentric paths of travel of a food item on the turntable.

16. The oven of claim 9, further comprising an outer cabinet encompassing said heating chamber to define an insulating air space between the cabinet wall and the heating chamber, and an exhaust fan for drawing air outwardly from the outer cabinet.

17. The oven of claim 16, wherein the switch means is also operative to activate rotation of the turntable and to activate the exhaust fan.

18. An oven for heating food items, comprising:
(a) a heating chamber;
(b) a heat sink turntable mounted in the chamber for constant rotation at a predetermined slow angular speed;
(c) chamber heating means;
(d) sensing and control means for causing the heating means to maintain the temperature of the turntable at a predetermined minimum level at all times;
(e) an entry slot in a wall of the chamber above the turntable;
(f) automatic switch means responsive to placement of a food item through the entry slot onto the turntable, to switch the heating means on if the heating means is off at the time;
(g) an exit slot in the wall of the chamber adjacent the periphery of the turntable;
(h) guide means for directing a food item on the turntable to the exit slot after rotation of less than 360 degrees, of the food item outwardly off the turntable; and
(i) a timer for switching off the heating means a predetermined time after the most recent activation of the entry switch means.

19. The oven of claim 18, further comprising a ramp extending downwardly through the entry slot to the turntable for gravity feed of food items to be heated, and wherein the switch means comprises a proximity switch positioned in the ramp so that it is activated by passage of a food item on the ramp.

20. The oven of claim 18, wherein the guide means comprises a bar extending above the turntable toward the exit slot at an obtuse angle to all possible concentric paths of travel of a food item on the turntable.

21. The oven of claim 18, further comprising an outer cabinet encompassing said heating chamber to define an insulating air space between the cabinet wall and the heating chamber, and an exhaust fan for drawing air outwardly from the outer cabinet.

22. The oven of claim 21, wherein the switch means is also operative to activate rotation of the turntable and to activate the exhaust fan.

23. A system for heating a precooked food item, comprising:
(a) a tray containing a partially or wholly precooked food item prepared in predetermined size and configuration;
(b) a heating chamber;
(c) a solid metal disk turntable mounted in the chamber for rotation at a predetermined slow angular speed;
(d) chamber heating means;
(e) an entry slot in a wall of the chamber above the turntable for conducting the tray onto the turntable;
(f) an exit slot in the wall of the chamber adjacent the periphery of the turntable; and
(g) guide means for directing the tray outwardly from the turntable to the exit slot after rotation sufficient to heat the food item.

24. The system of claim 23 further comprising sensing and control means for causing the heating means to maintain the turntable at a temperature above a predetermined minimum level.

* * * * *